E. PITCHER.
Sinker for Fishing-Lines.

No. 167,687.  Patented Sept. 14, 1875.

WITNESSES:
A. W. Almqvist
A. F. Terry

INVENTOR:
Edward Pitcher
BY
Munn
ATTORNEYS.

UNITED STATES PATENT OFFICE.

EDWARD PITCHER, OF BROOKLYN, NEW YORK.

IMPROVEMENT IN SINKERS FOR FISHING-LINES.

Specification forming part of Letters Patent No. 167,687, dated September 14, 1875; application filed July 10, 1875.

*To all whom it may concern:*

Figure 1:
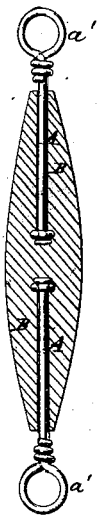
Figure 2:
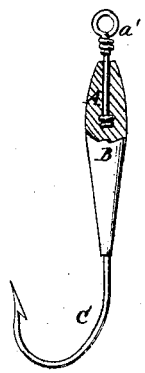

Be it known that I, EDWARD PITCHER, of Brooklyn, in the county of Kings and State of New York, have invented a new and useful Improvement in Swiveled Sinkers, of which the following is a specification:

Figure 1 is a longitudinal section of one of my improved swiveled sinkers. Fig. 2 represents the swiveled sinkers as applied to a fish-hook.

Similar letters of reference indicate corresponding parts.

The invention will first be fully described in connection with drawing, and then pointed out in the claims.

A are the wires, which have heads formed upon their inner ends, and have washers placed upon them close to said heads. The wires A are then placed in the molds in grooves formed to receive them, and with their heads toward and at a little distance from each other. The wires A are coated with plumbago or other suitable substance to prevent the metal from adhering to them. When the wires A have been secured in the molds the lead, tin, or other metal of which the sinker B is to be made is poured in. With this construction, when the sinker B has been removed from the mold, the wires A can be readily turned within it. When the sinker is to be attached directly to the shank of a fish-hook, the shank of the hook C and a wire, A, are inserted in the mold, and the sinker B cast around them. In this case the sinker B and hook C may be rigidly connected together, or the shank of the hook C may be provided with a head and washer, and swiveled to the sinker B in the same manner as the wires A. Eyes $a'$ are formed upon the outer ends of the wires A either before or after the sinker B has been cast upon them, but preferably after, as they can be more readily secured in the mold when without the eyes.

Having thus described my invention, I claim as new and desire to secure by Letters Patent—

1. The combination, with a sinker, B, cast in a single piece, of an end-looped wire, A $a'$, having the concealed swivel in each end, all constructed and arranged substantially as and for the purpose described.

2. As a new article of manufacture, consisting of sinker B, concealed swivel-wire A $a'$, and rigidly-fixed hook C, substantially as shown and described.

EDWARD PITCHER.

Witnesses:
JAMES T. GRAHAM,
T. B. MOSHER.